(12) United States Patent
Ericksen et al.

(10) Patent No.: US 6,619,570 B1
(45) Date of Patent: Sep. 16, 2003

(54) TELESCOPING WATERING WAND

(75) Inventors: Kent C. Ericksen, North Salt Lake, UT (US); Phillip A. Hudman, Bountiful, UT (US); Robert L. Parker, West Valley City, UT (US); Jeffrey P. Maughan, West Bountiful, UT (US)

(73) Assignee: Orbit Irrigation Products, Inc., Bountiful, UT (US)

( * ) Notice: Subject to any disclaimer, the term of this patent is extended or adjusted under 35 U.S.C. 154(b) by 183 days.

(21) Appl. No.: 09/883,124

(22) Filed: Jun. 14, 2001

Related U.S. Application Data

(60) Provisional application No. 60/211,547, filed on Jun. 14, 2000.

(51) Int. Cl.[7] .............................................. B05B 15/06
(52) U.S. Cl. .................... 239/532; 239/587.4; 239/600; 285/145.3; 285/148.2
(58) Field of Search ................................ 239/390, 397, 239/530, 532, 587.1, 587.4, 588, 589, 600; 285/144.1, 145.1, 145.3, 146.1, 148.2, 302

(56) References Cited

U.S. PATENT DOCUMENTS

| | | | |
|---|---|---|---|
| 1,758,115 A | * | 5/1930 | Kelly ....................... 239/587.4 |
| 2,257,585 A | * | 9/1941 | Auvil .......................... 239/532 |
| 2,776,168 A | * | 1/1957 | Schweda .................. 239/587.4 |
| 3,640,465 A | * | 2/1972 | Hicks .......................... 239/600 |
| 4,596,484 A | | 6/1986 | Nakatani |
| 4,793,646 A | | 12/1988 | Michaud, Jr. |
| 4,818,135 A | | 4/1989 | Desjardins |
| 4,832,318 A | | 5/1989 | Wang |
| 4,860,987 A | | 8/1989 | Werner |
| 4,950,008 A | | 8/1990 | Fang |
| 5,011,319 A | | 4/1991 | Levi et al. |
| 5,020,558 A | | 6/1991 | Huang |
| 5,129,245 A | | 7/1992 | Chang |
| 5,154,449 A | | 10/1992 | Suei-Long |
| 5,238,213 A | | 8/1993 | Pool |
| 5,267,480 A | | 12/1993 | Krizan |
| 5,352,057 A | | 10/1994 | Zody |
| 5,413,180 A | | 5/1995 | Ross et al. |
| 5,425,526 A | | 6/1995 | Shen |
| 5,433,551 A | | 7/1995 | Gordon |
| 5,492,430 A | | 2/1996 | Jones |

(List continued on next page.)

FOREIGN PATENT DOCUMENTS

| | | |
|---|---|---|
| DE | 0518091 | 10/1994 |
| DE | 0534313 | 12/1994 |
| DE | 0643002 | 10/1997 |
| EP | 0653023 | 6/1998 |
| EP | 0673876 | 4/1999 |
| JP | 08175400 | 7/1996 |
| JP | 09206860 | 8/1997 |
| JP | 10053144 | 2/1998 |
| JP | 10274371 | 10/1998 |
| JP | 11193804 | 7/1999 |
| WO | WO94/01683 | 1/1994 |

OTHER PUBLICATIONS

"Quick Connects," pp. 488–6156.

*Primary Examiner*—Steven J. Ganey
(74) *Attorney, Agent, or Firm*—Madson & Metcalf

(57) ABSTRACT

A watering wand allows for telescopic adjustment of its length. The wand includes a primary tube defining a hollow interior portion and a secondary tube slidably disposed within the primary tube. The primary tube includes a fitting for attaching the wand to a water source. The secondary tube includes a connector suitable for receiving a fluid dispensing nozzle. The secondary tube also defines a portion to allow fluid to pass between the water source and the connector. An adjustment collar attached to a distal end of the primary tube slidably engages the secondary and may be used to fix the position of the secondary tube relative to the primary tube. The connector may be attached to a ball and joint coupling to allow for a pivoting nozzle and a quick-connect coupling to allow for easily changing nozzles to meet various watering needs.

13 Claims, 7 Drawing Sheets

U.S. PATENT DOCUMENTS

| | | |
|---|---|---|
| 5,499,767 A | 3/1996 | Morand |
| 5,513,554 A | 5/1996 | Paulsson |
| 5,549,407 A | 8/1996 | Levi et al. |
| 5,564,139 A | 10/1996 | Shorr |
| 5,593,239 A | 1/1997 | Sallee |
| 5,594,990 A | 1/1997 | Brant et al. |
| 5,622,446 A | 4/1997 | Hibberd |
| 5,669,103 A | 9/1997 | Hui |
| 5,791,980 A | 8/1998 | Kramer, Jr. |
| 5,836,564 A | 11/1998 | Duran |
| 5,876,147 A | 3/1999 | Longo |
| 5,894,805 A | 4/1999 | Raasch et al. |
| 5,897,268 A | 4/1999 | Deville |
| 6,010,267 A | 1/2000 | Vito |
| 6,027,087 A | 2/2000 | Lindemann et al. |
| 6,035,873 A | 3/2000 | Lin et al. |
| 6,045,284 A * | 4/2000 | Chiu .................... 285/302 |
| 6,050,531 A | 4/2000 | Wilcox |
| 6,113,004 A * | 9/2000 | Steingass et al. ........... 239/390 |
| 6,158,677 A | 12/2000 | Coles |
| 6,164,569 A | 12/2000 | Hollinshead et al. |

* cited by examiner

TELESCOPING WATERING WAND

RELATED APPLICATIONS

This application claims the benefit of the earlier filed United States provisional patent application Serial No. 60/211,547, filed Jun. 14, 2000, and titled "Telescoping Wand," which is incorporated herein by reference.

BACKGROUND OF THE INVENTION

1. The Field of the Invention

The present invention relates to a wand device for watering plants. More particularly, the present invention relates to an adjustable telescoping wand adapted for use with a standard garden hose and configured with a pivotal, quick-connect coupling for receiving fluid dispensing nozzles.

2. The Relevant Technology

Gardening has become a popular hobby and home gardeners of all ages and abilities are enjoying this rewarding past time. Many garden tools have been developed to enhance people's gardening experience by making gardening easier and more comfortable. One such tool is the wand-type sprinkler commonly used to water plants and the like. Such wands are attached to a water source and allow a gardener to extend their reach to water distant or hanging plants or deep planting beds.

One disadvantage with common wand type watering devices is their size. Long narrow products take up space which increases shipping and transportation costs. The length of the wand requires unique packaging and extra material which also increases cost. In addition, where the wand has an angled head, the width or size of the wand is increased, adding to the shipping and packaging costs. Further, long narrow products with bulky or oversized heads are often difficult and clumsy to display. Any amount of jostling causes these items to topple or rotate into an unsightly arrangement. Further, display space is at a premium at today's home product store where products stacked or displayed in warehouse style, one on top of the other. Elongated products that cannot be displayed efficiently may not be displayed at all.

An additional disadvantage with many wand-type sprinklers is that they lack the flexibility or adaptability to meet varying watering needs. Many wands have a single, non-adjustable spray nozzle that is either difficult to detach or not detachable at all.

Thus, it would be an advancement in the art to provide a watering wand with an adjustable length that can be retracted for efficient shipping, packaging, and display. It would be an additional advancement in the art to provide such a wand with a pivotal end for various watering angles and for more efficient storing and display. It would be an additional advancement in the art to provide a wand for use with a variety of nozzles that may easily be exchanged to meet a variety of watering demands.

Such a wand in accordance with the present invention is disclosed and claimed herein.

BRIEF SUMMARY OF THE INVENTION

The present invention solves many or all of the foregoing problems by introducing a wand that is telescopic and that provides for a pivotal head and easy to remove spray nozzles.

The invention provides a wand-type watering device preferably with a hose-type fitting at one end, and a connector for receiving a fluid dispensing nozzle or head at an opposing end. In accordance with one aspect of the present invention, the wand telescopes, having a secondary tube slidably disposed in a primary tube. An adjustment collar may fix the secondary tube relative to the primary tube. Thus, a user may extend or retract the wand to a desired length, and the wand may be reduced in length for shipping, thus reducing shipping costs.

In accordance with another aspect of the present invention, a ball and joint coupling may be disposed at an end of the wand which provides a pivoting connector for a fluid dispensing nozzle or head. Thus, the fluid-dispensing nozzle or head may be angled as desired, and the overall width of the wand may be reduced for shipping, packaging or storage, thus reducing costs.

The wand may also include a quick-connect coupling at an end of the wand which provides a connector for a fluid-dispensing nozzle or head, and allows for quickly interchanging different types of fluid-dispensing nozzles or heads. The quick-connect coupling may include a male member with a notch for receiving a protruding female member of the coupling. This prevents the coupling from rotating at the connection point.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 7, is not intended to limit the scope of the invention, as claimed, but is merely representative of presently preferred embodiments of the invention.

Figure 1:
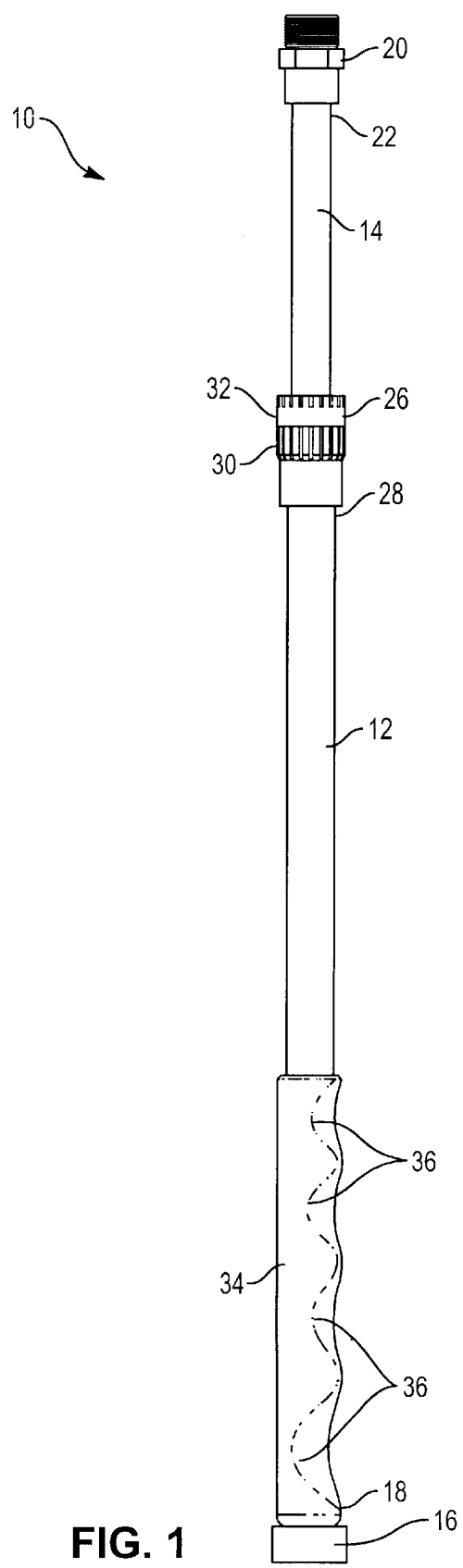
FIG. 1 is a side plan view of telescoping watering wand according to the teachings of the present invention.

With particular reference to FIG. 1, a telescoping watering wand is generally designated at 10. The wand 10 includes a primary tube 12 and a secondary tube 14 slidably disposed within the primary tube 12 for telescopic movement of the wand 10 between a retracted position and an extended position. In the retracted position, the wand has a shorter length for efficient packaging, while in the extended position, the wand has a longer length for watering items at a greater distance from the user. In one embodiment, the wand 10 can expand between about 18 inches and about 36 inches. A fitting 16 is attached at a proximal end 18 of the primary tube 12 for connecting the wand 10 to a water source (not shown). In one embodiment, the fitting 16 is a threaded female member for receiving a corresponding male member coupling of a standard garden hose.

A connector 20 may be attached at a distal end 22 of the secondary tube 14. The connector 20 is configured threaded to receive a variety of fluid dispensing nozzles. The connector may be integral with the distal end 22 of the secondary tube 14, or may be a separate piece attached to the secondary tube 14 by methods including, but not limited to, welding, epoxy, swage fitting, or other known connecting methods.

It will be appreciated by those of skill in the art that more than two tubes may be used to accomplish the telescopic extension of the watering wand 10. Further, the fitting 16 may be attached to the secondary tube 14 and the connector 20 may be attached to the primary tube 12. In the embodiment, the secondary tube 14 may slidably engage an outside surface of the primary tube 12.

An adjustment collar 26 is attached to a distal end 28 of the primary tube 12 for fixing the position of the secondary tube 14 relative to the primary tube 12. As will be discussed in greater detail below, the adjustment collar 26 may have a lower member 30 fixed to the primary tube 12 and an upper member 32 rotationally engaged to the lower member 30 such that when the upper member 32 rotates relative to the lower member 30, the secondary tube 14 is prevented from moving relative to the primary tube 12. It will be appreciated that the securement of the secondary tube 14 relative to the primary tube 12 may be accomplished by other means, including a pushpin/hole mechanism, a latch with openings, a clamp, a cotter pin assembly and the like. Suitable seals may be used to prevent leakage.

The wand 10 may also include a handle 34 formed at the proximal end 18 of the primary tube 12 to facilitate gripping of the wand 10. In one embodiment, the handle 34 includes valleys 36 which correspond to the finger positions of a user's hand. The handle 34 may be formed by injection molding and secured to the primary tube by bonding or other means known in the art.

Figure 2:
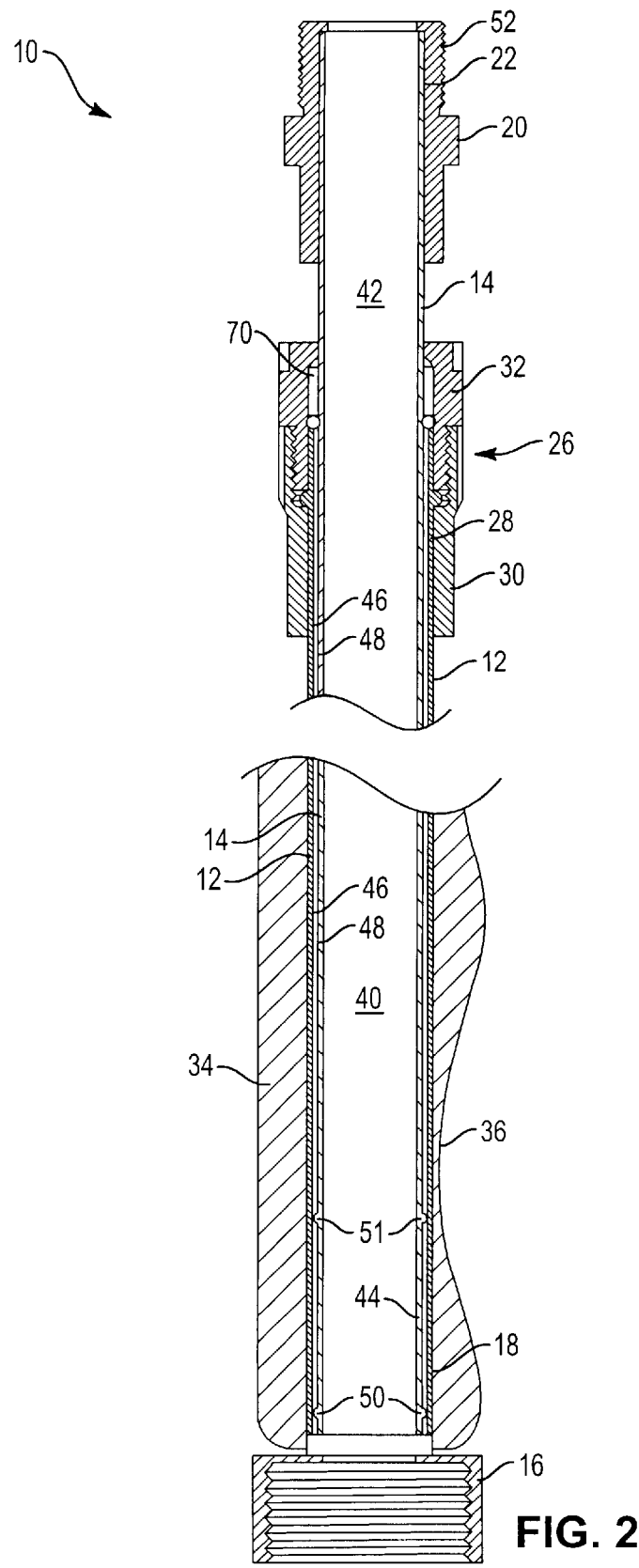
FIG. 2 is a side plan cross section view of the telescoping wand of FIG. 1 in a retracted position.

Referring now to FIG. 2, the wand 10 of the present invention is shown in the retracted position. The primary tube 12 includes a hollow interior portion 40 (best seen in FIG. 3) which allows fluid to be communicated between the proximal end 18 of the primary tube 12 and the distal end 28 of the primary tube 12. The fitting 16 is in fluid communication with the hollow interior portion 20 of the primary tube. The secondary tube 14 also includes a hollow interior portion 42 for communicating fluid between a proximal end 44 of the secondary tube 14 and a distal end 22 of the secondary tube 14. The connector 20 may be in fluid communication with the hollow interior portion 42 of the secondary tube 14. The hollow interior portion 40 of the primary tube 12 is in fluid communication with the hollow interior portion 42 of the secondary tube 14 to permit fluid flow along the length of the wand 10 in both the retracted and extended positions.

The primary tube 12 includes an inner surface 46 and the secondary tube 14 includes an outer surface 48. In one embodiment each tube 12, 14 is substantially cylindrical. A diameter of the primary tube 12 is slightly larger than a diameter of the secondary tube 14 which allows the secondary tube 14 to be positioned substantially within the primary tube 12 when the wand 10 is in the retracted position.

The secondary tube 14 may also include at least one guide member 50 and preferably a plurality of spaced-apart guide members 50, 51 positioned between the primary and secondary tubes 12, 14. The guide members 50, 51 help to substantially maintain the secondary member 14 in coaxial relationship with the primary member 12. In one embodiment, the guide members 50, 51 are formed into, and are integral with, the outer surface 48 of the secondary member 14. In the illustrated configuration, the guide members 50, 51 are positioned between the outer surface 48 of the secondary tube 14 and the inner surface 46 of the primary tube 12.

The guide members 50, 51 are configured to slidably abut the inner surface 46 of the primary tube 12 to reduce the lateral movement of the secondary tube 14 within the primary tube 12. In an alternative embodiment, the guide members 50, 51 may be configured within the inner surface 46 of the primary tube 12. Additionally, the guide members 50, 51 may be separate bushings positioned between the tubes 12, 14. For example, the guide members 50, 51 may be attached to either the inner surface 46 of the primary tube 12 or the outer surface 48 of the secondary tube, or allowed to slide freely between the tubes 12, 14. It will further be appreciated that integral projections on one or more respective surfaces 46, 48 of the primary and secondary tubes 12, 14 or separate bushings may be used in various combinations to practice the teachings of this invention. For example, one annular guide 50, 51 may be configured in the primary tube 12 and one annular guide 50, 51 may be configured in the secondary tube 14. A slidable bushing may be positioned in between the two.

The connector 20 is a male coupling with threads 52 for receiving a standard spray nozzle coupling (not shown). The connector may be integral with the distal end 22 of secondary tube 14, or may be a separate piece attached to the distal end 22 of the secondary tube 14 by bonding, welding, press or swage fitting, or other known methods of attachment. As will be discussed in greater detail below, additional connectors such as ball and joint connectors, quick-connect connectors or other types of connectors may be integral with, or attached to the distal end 22 of the secondary tube 14. Each connector may be configured to receive a variety of spray or drip nozzles with standard female or male hose couplings. In another embodiment, the spray nozzle may be integral with the connector 20 and the distal end 22 of the secondary tube 14.

Figure 3:
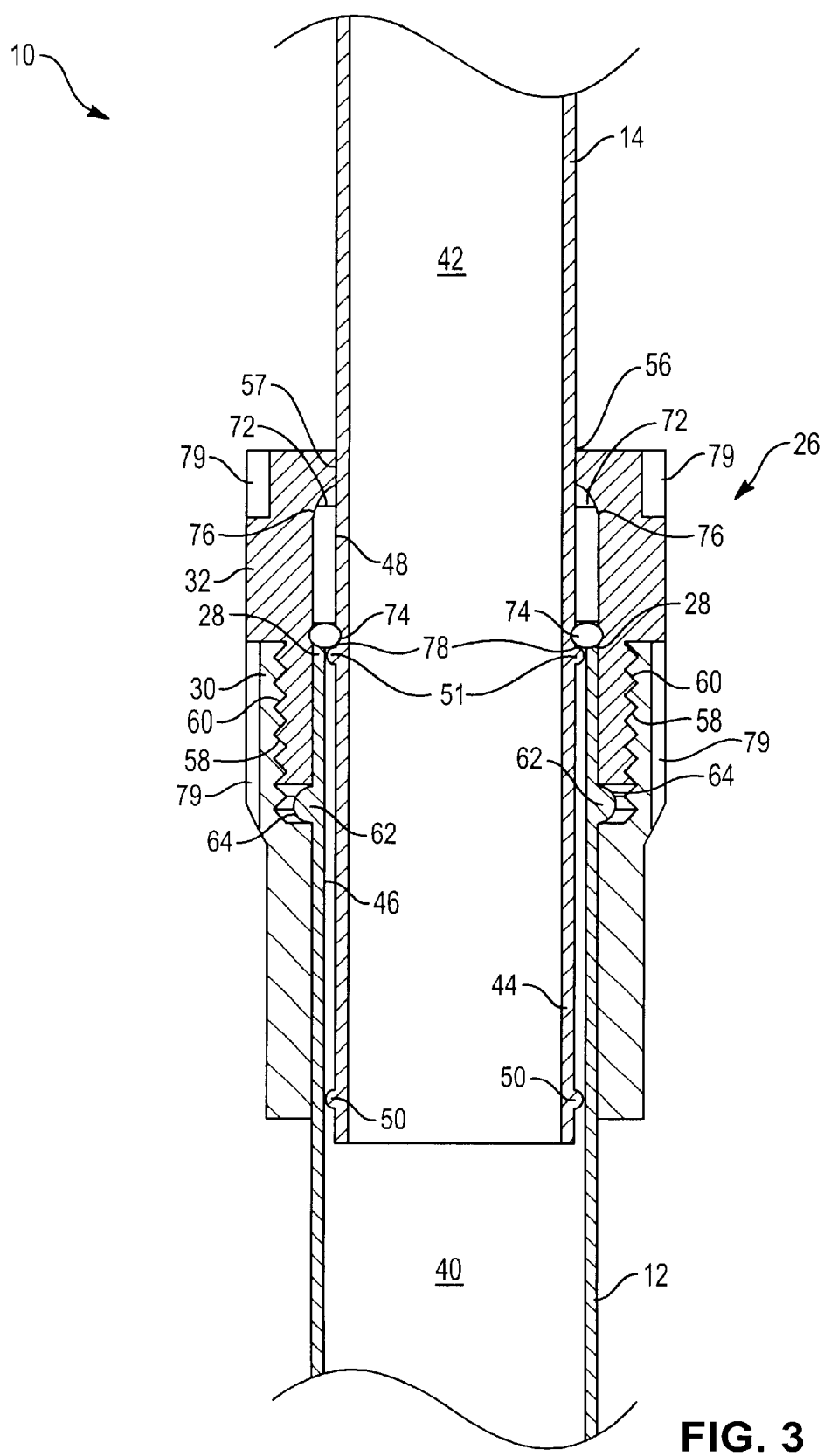
FIG. 3 is a side plan cross section view of a portion of the wand in an extended position.

Referring now to FIG. 3, a portion of the wand 10 of the present invention is shown with the wand 10 in the extended position. The adjustment collar 26 defines an aperture 56 having a diameter slightly larger than the outer surface 48 of the secondary tube 14. The secondary tube 14 is slidably received within the aperture 56. The aperture 56 is spaced apart from the distal end 28 of the primary tube 12 to provide an annular point of contact 57 between the primary tube 12 and the secondary tube 14 which increases stability between the tubes 12, 14, especially when the wand 10 is in the extended position. In one embodiment, the aperture 56 may be fitted with a plastic bushing to facilitate sliding of the tubes 12, 14 relative to each other. An upper guide member 51 is configured to form an enlarged portion at or near the proximal end 44 of the secondary tube 14 which portion is greater than the aperture 56 in the adjustment collar 26. Thus, the upper guide member 51 helps maintain the proximal end 44 of the secondary member 14 within the primary tube 12 when the wand 10 is in the extended position.

The lower member 30 of the adjustment collar 26 is configured with interior threads 58 for engaging exterior threads 60 configured within the upper member 32. The lower member 30 may be secured to the primary tube 12 by bonding, or other known methods. In one embodiment, the primary tube 12 is configured with an annular bulge 62 configured to fit within a corresponding depression 64 within the lower member 30 of the adjustment collar 26. This configuration prevents the lower member 30 from moving axially with respect to the primary tube. When the corresponding threads 58, 60 of the upper member 32 and the lower member 30 engage each other, the upper member 32 may be rotated to drive the upper member 32 deeper within the lower member 30. In one embodiment, the bulge 62 acts as a stop which engages the upper member 32 and provides a limit to the rotational movement of the upper member 32 relative to the lower member 30 in one direction.

The adjustment collar 26 includes a crimp bushing 70 positioned about a portion of the secondary tube 14 for restricting movement of the secondary tube 14 relative to the adjustment collar 26 when the adjustment collar 26 is in a locked or secured position. The crimp bushing 70 is generally annular with a rectangular cross-section. The crimp bushing 70 is positioned with a cavity 72 defined by the upper member 32 of the adjustment collar 26, the secondary member 14, and a seal 74. The cavity 72 elongates or shortens with the rotational movement of the upper member 32 relative to the lower member 30. The upper member 32 has a curved portion 76 that engages the bushing 70 when the upper member 32 is rotated further within the lower member 30. The seal 74, together with the distal end 28 of the primary tube 12 act as a stop for the bushing 70. When the bushing engages this stop, further rotation of the upper member 32 within the lower member 30 causes the curved portion 76 of the upper member 32 to exert an inward force on the bushing 70 such that the bushing 70 frictionally holds the secondary tube 14 relative to the adjustment collar 26 and attached primary tube 12.

The seal 74 is disposed within the cavity 72 between the upper member 32 of the adjustment collar 26 and the secondary tube 14. The seal 74 is positioned to abut the distal end 28 of the primary tube 12 to prevent fluid from leaking out from between the primary tube 12 and the secondary tube 14, and thus out of the aperture 56. In one embodiment, the seal 74 is an O-ring compression seal configured and positioned to be compressed against the outer surface 48 of the secondary tube 14 at the distal end 28 of the primary tube 12 when the upper member 32 is rotated within the lower member 30. It will be appreciated that the compression of the seal 74 provides a lateral force against the secondary member 14 which not only helps seal a joint 78 between the primary and secondary members 12, 14, but also assists in maintaining the secondary member 14 relative the primary member 12 when the adjustment collar 26 is in the locked or secured position. It will be appreciated that a number of seals or O-rings may be configured and positioned in a variety of ways to prevent fluid leakage in the wand 10.

The seal 74, in combination with the bushing 70, also acts as a stop for the upper guide member 51 of the secondary tube 14. When the wand 10 is in a fully extended position, the upper guide member 51 engages the seal 74 and prevents the secondary tube 14 from pulling all the way out of the primary tube 12. The seal 74 and guide members 50 which act as stops, may be positioned relative to each other to retain an optimal amount of secondary tube 14 within the primary tube 12 for maximum stability.

The adjustment collar 26 may also include external indentations 79 for better gripping of the adjustment collar 26 by user. In the present embodiment, the indentations 79 are axial and spaced about both the lower member 30 and the upper member 32 of the adjustment collar 26.

Figure 4:
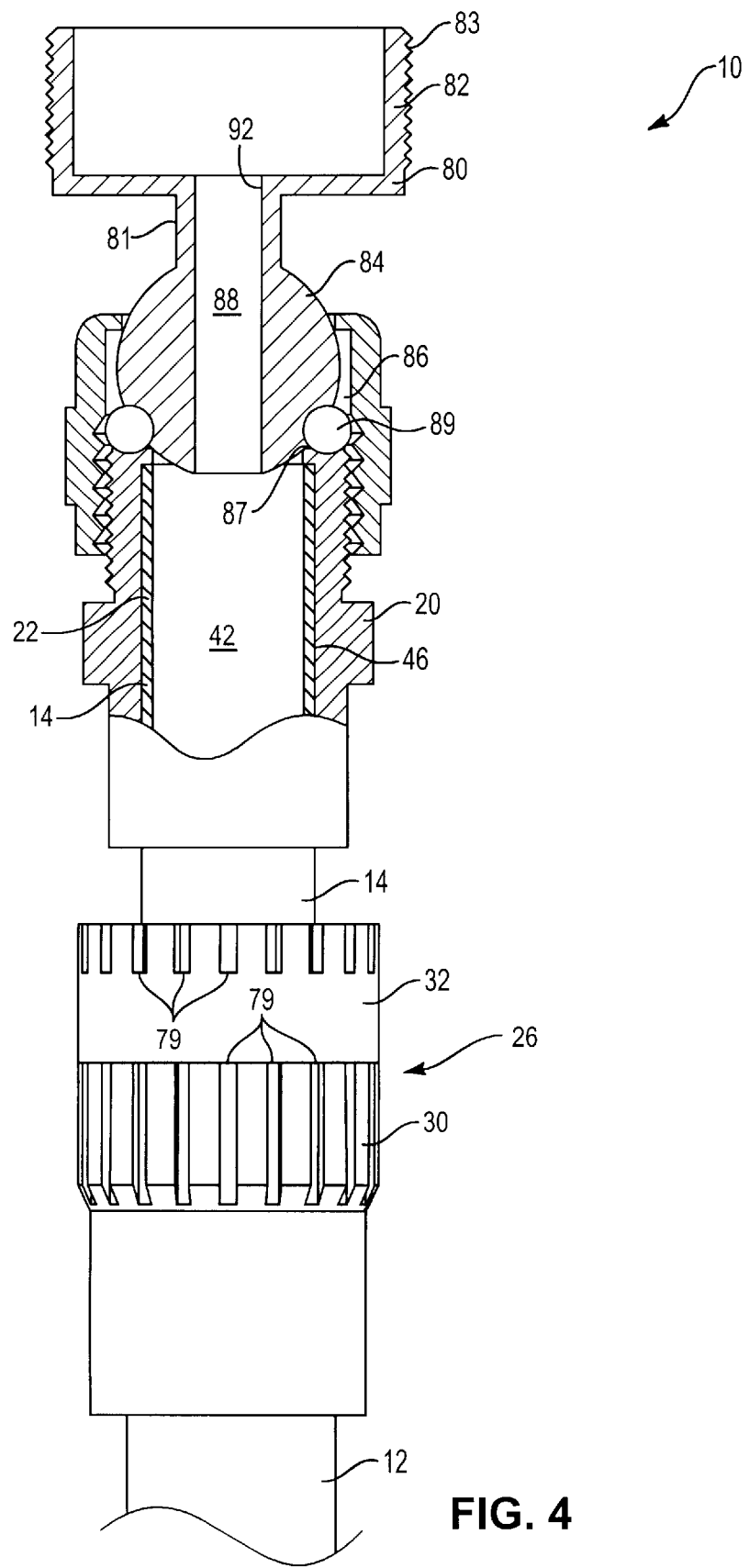
FIG. 4 is a partially cutaway side plan view of the telescoping wand in a retracted position with a ball and joint coupling.

Referring now to FIG. 4 a ball and joint coupling 80 is attached at the connector 20. As discussed above, the ball and joint coupling 80 may be integral with the connector 20 and attached to the distal end 22 of the secondary tube 14 by means known in the art, including corresponding threading, bonding, welding, press or swage fitting and the like. The ball and joint coupling 80 may also be integral with the distal end 22 of the secondary member 14. In the illustrated embodiment, the ball and joint coupling 80 is a separate attachment in threaded engagement with the connector 20. The ball and joint coupling 80 is configured with a male fitting 82 having threads 83 for attachment to a standard female fitting found on a variety of fluid dispensing nozzles (not shown). The ball and joint coupling 80 allows a fluid dispensing nozzle to move throughout a predetermined range of motion.

In one embodiment, a substantially spherical ball 84 is configured to be seated within a socket 86. The ball 84 may be connected to the male fitting 82 by a stem member 81. The socket 86 is configured to receive the ball 84 in pivotal engagement. The socket 86 may be formed of multiple pieces attached together about the ball 84 in various ways known in the art, or may be one integral piece with the ball 84 press-fit into place. Accordingly, a fluid dispensing nozzle attached to the ball and joint coupling 80 may be pivoted through a wide range of motion relative to the wand 10 in a frusto-conical area defined by the range of movement of the ball 84 within the socket 86. Thus, the ball and joint coupling 80 allows an attached fluid dispensing nozzle or head to pivot into an aligned position with respect to the tubes 12, 14 reducing the width of the wand 10, and thus reducing the shipping and packaging costs.

The ball 84 defines a passage 88 extending substantially along a diameter of the ball 84 and through the stem member 81 between a first opening 90 and a second opening 92. The second opening 92 of the passage is in communication with the male fitting 82. The threaded engagement of the ball and socket coupling 80 to the connector 20 maintains the first opening of the passage 88 in communication with the hollow interior portion 42 of the secondary tube 14. An annular seal or O-ring 89 is positioned at joint 87 between the ball 84 and socket 86 to prevent leakage. Thus, fluid may pass from the water source fitting 16 (FIG. 1) through the wand 10 and through the ball and joint coupling 80 into a fluid dispensing nozzle (not shown) and out into the surrounding environment. It will be appreciated by those of skill in the art the coupling 80 may be configured in a variety of ways to allow pivotal movement of an attached connector, coupling, or nozzle with respect to the wand 10. These may include a flexible pipe or stem member 81 in place of or in addition to the ball 84, fixed to the socket 86 or other appropriate base member.

Figure 5:
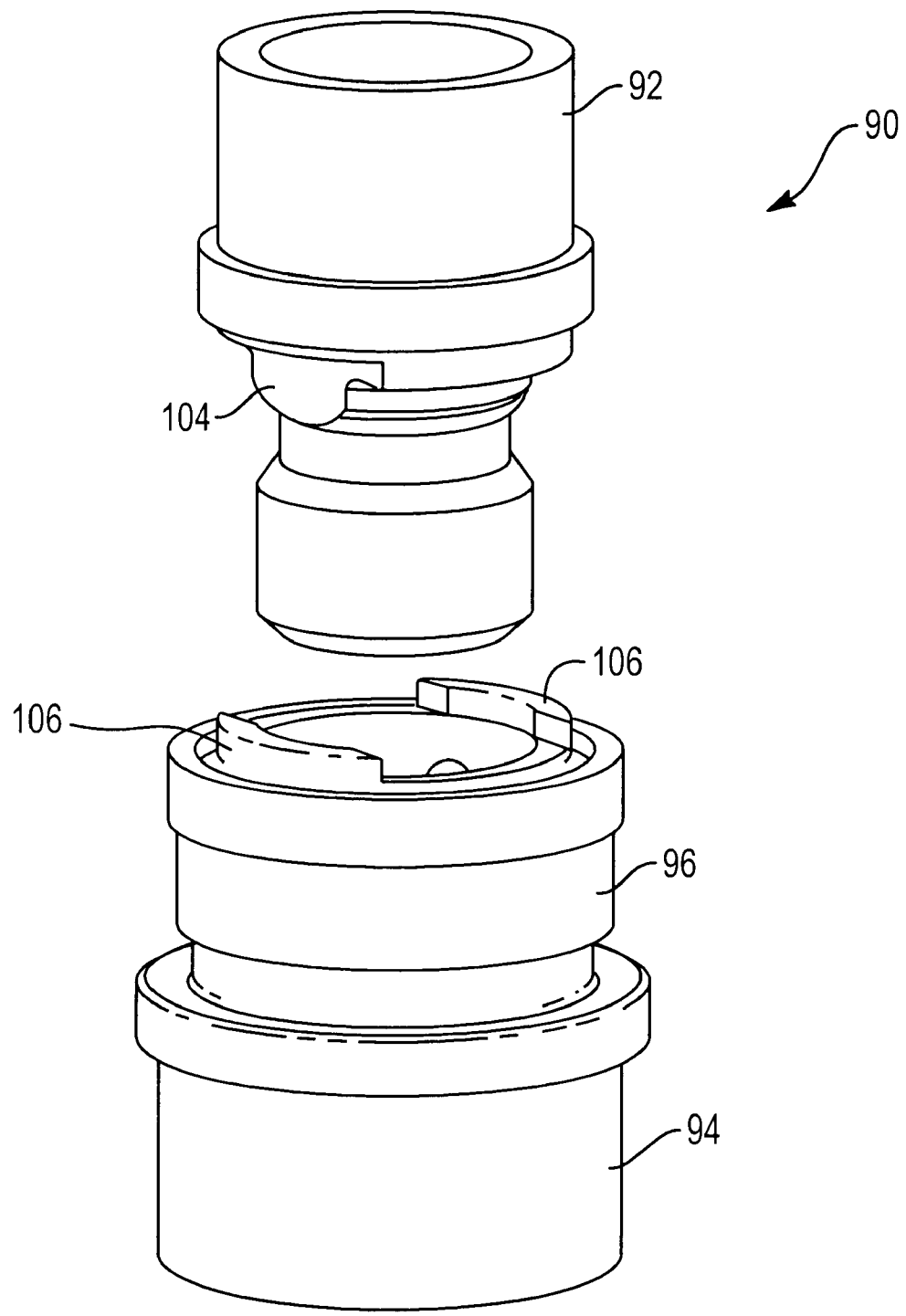
FIG. 5 is a perspective of a quick connect coupling suitable for use the telescoping wand of the present invention.
Figure 6:
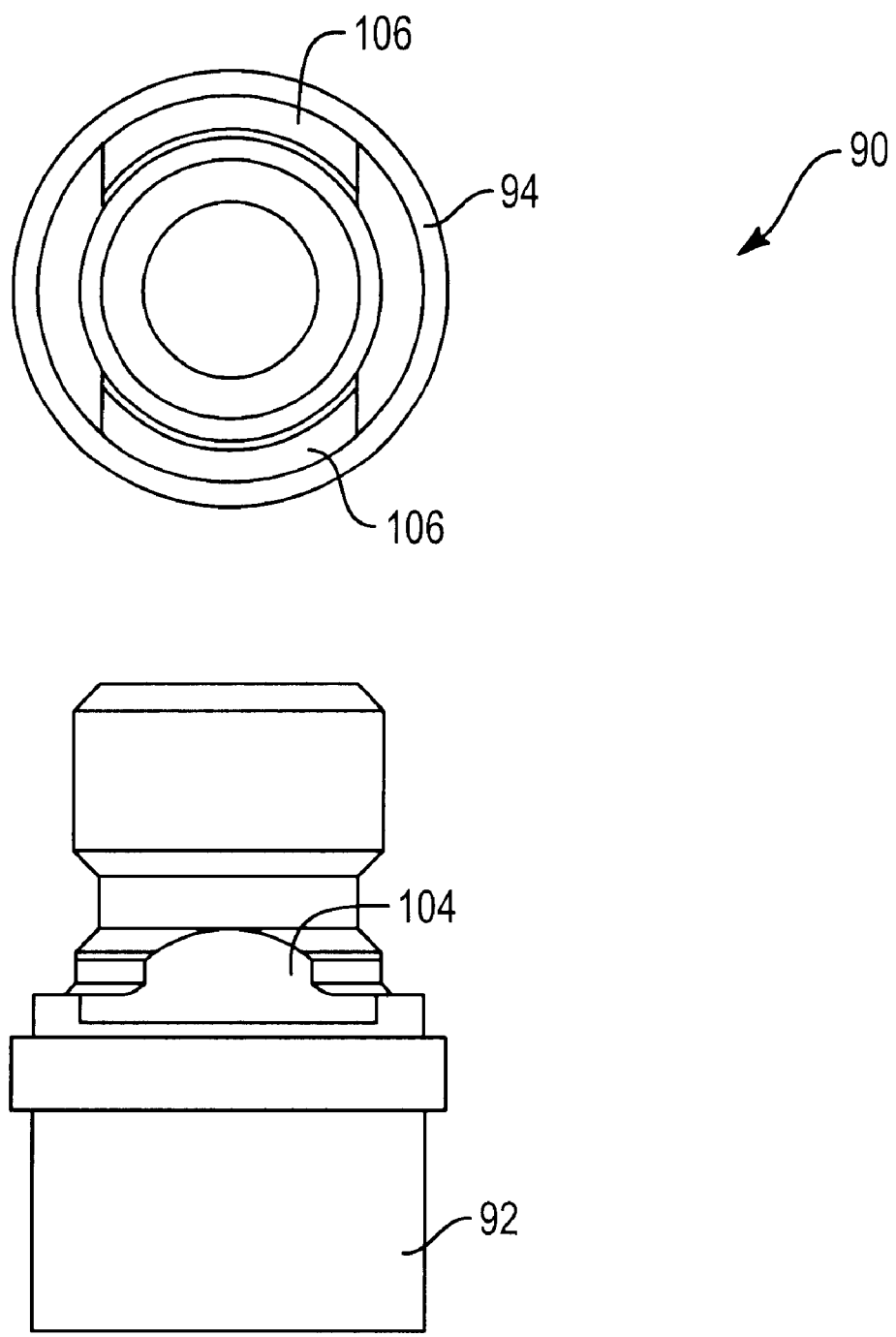
FIG. 6 is a side plan view of the male member of the quick connect coupling of FIG. 5 and a top plan view of the female member of the quick connect coupling of FIG. 5.

Referring now to FIGS. 5 and 6, a quick-connect coupling 90, suitable for use with the present invention is shown. As discussed above, the quick-connect coupling 90 may be integral with the connector 20 and attached to the distal end 22 of the secondary tube 14 by means known in the art including corresponding threads, bonding, welding, press or swage fitting and the like. The quick-connect coupling 90 may also be integral with the distal end 22 of the secondary member 14. In the illustrated embodiment, the quick-connect coupling 90 is a separate attachment in threaded engagement with the connector 20. The quick-connect coupling 90 includes a female member 94 and a male member 92 configured for mating engagement with the female member 94. The male member 92 may be configured with threads for attachment to a standard fitting on most fluid dispensing nozzles.

The female member has a movable release collar 96 which can be slid up or down to release or retain the male member 92. In one embodiment, the collar 96 includes a biasing spring 98 which maintains the collar 96 in a retention position (see FIG. 7). The male member 92 may contain ball bearings (not shown) which can be positioned within openings 100 or slots in the female member 94. With the release collar 96 biased in the retention position, the ball bearings cannot move out of the openings 100 or slots in which they are seated, and the male member 92 is retained within the female member 94. By exerting a force upon the release collar 96 sufficient to overcome the biasing force of the spring 98, the ball bearings may be removed from the openings 100 or slots. The male member 92 may then be released from the female member 94. It will be appreciated that a variety of fluid dispensing nozzles may be secured to a number of male members 92 and quickly attached or released to the connector 20 end of the wand 10. For example, a turret-type head quickly may be attached to the end of the wand for one purpose, but quickly removed or replaced by another type of head.

A notch 104 and corresponding protrusion 106 may be formed in the quick-connect coupling 90. The notch 104 is configured to receive the protrusion 106 within the notch 104 when the male and female members 92, 94 are connected. This prevents the male and female members 92, 94 from rotating with respect to each other when connected. In this configuration, a fluid dispensing nozzle attached to the quick-connect coupling 90 is prevented from rotating about its connection to the wand 10. In one embodiment, a pair of notches 104 formed in the male member 92 are configured to receive a corresponding pair of protrusions 106 formed in the female member 94. It will be appreciated by those of skill in the art that in alternative embodiments, a pin, clamp or ring, or other suitable device may be used in combination with a variety of slots, notches or depressions to prevent rotation of the male member 92 with respect to the female member 96.

Figure 7:
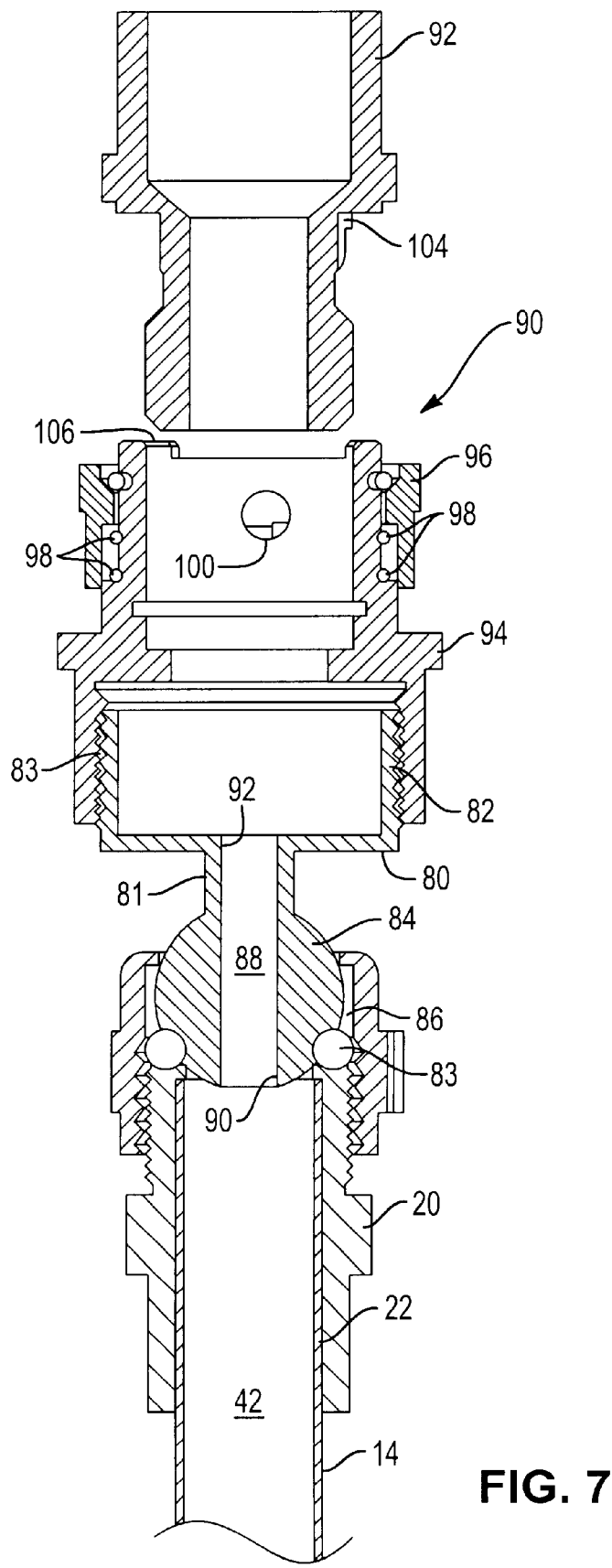
FIG. 7 is a side plan view of the a portion of the telescoping wand of the present invention with a ball and joint coupling and a quick-connect coupling

Referring now to FIG. 7, the quick-connect coupling 90 and the ball and joint coupling 80 are both disposed between an attached fluid dispensing nozzle or head and the connector 20 at the distal end 22 of the secondary tube 14. In this configuration, the advantages of both of these couplings 80, 90 may be realized. It will be appreciated that the female member 94 of the quick connect coupling 90 may be integral with the ball 84 or fitting 82 of the ball and joint coupling 80. Additionally, the socket 86 of the ball and joint coupling 80 may be integral with the male member 92 of the quick connect coupling 90 where the position of the couplings 80, 90 is switched. Furthermore, the ball and joint coupling 80, the quick-connect coupling 90, and the connector 20 may all be one integral assembly.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A watering wand, comprising:
    a primary tube defining a hollow interior portion for communicating fluid between a proximal end and a distal end of the primary tube:
    a fitting attached at the proximal end of the primary tube for connecting the wand to a water source;
    a secondary tube slidably disposed within the primary tube for telescopic movement of the wand between a retracted position and an extended position, the secondary tube defining a hollow interior portion for communicating fluid between a proximal end and a distal end of the secondary tube;
    a connector, for receiving a fluid dispensing nozzle, attached at the distal end of the secondary tube; and
    a plurality of spaced-apart guide members that are positioned between an outer surface of the secondary tube and slidably abut an inner surface of the primary tube.

2. The wand of claim 1, wherein the guide members are formed on the outer surface of the secondary tube.

3. The wand of claim 1, wherein the guide members are integral with the secondary tube.

4. A watering wand, comprising:
    a primary tube defining a hollow interior portion for communicating fluid between a proximal end and a distal end of the primary tube;
    a fitting attached at the proximal end of the primary tube for connecting the wand to a water source;
    a secondary tube slidably disposed in relation to the primary tube for telescopic movement of the wand between a retracted position and an extended position, the secondary tube defining a hollow interior portion for communicating fluid between a proximal end and a distal end of the secondary tube; and
    a connector, for receiving a fluid dispensing nozzle, attached at the distal end of the secondary tube, the connector being a quick-connect coupling comprising a female member and a male member, wherein a notch and a corresponding protrusion are formed on the quick-connect coupling such that the protrusion is received within the notch when the male and female members are connected, thereby preventing the male and female member from rotating with respect to each other.

5. A watering wand, comprising:
- a primary tube defining a hollow interior portion for communicating fluid between a proximal end and a distal end of the primary tube;
- a fitting attached at the proximal end of the primary tube for connecting the wand to a water source;
- a secondary tube slidably disposed within the primary tube for telescopic movement of the wand between a retracted position and an extended position, the secondary tube defining a hollow interior portion for communicating fluid between a proximal end and a distal end of the secondary tube;
- a connector, for receiving a fluid dispensing nozzle, attached at the distal end of the secondary tube;
- an adjustment collar for fixing the position of the secondary tube relative to the primary tube, the adjustment collar attached to the distal end of the primary tube, the collar defining an aperture in which the secondary tube is received;
- at least one guide member positioned between the secondary tube and the primary tube to substantially maintain the secondary tube in coaxial relationship with the primary tube; and
- a handle formed at the proximal end of the primary tube to facilitate the gripping of the wand wherein a plurality of the spaced-apart guide members are positioned between an outer surface of the secondary tube and slidably abut an inner surface of the primary tube.

6. The wand of claim 5, wherein the guide members are formed on the outer surface of the secondary tube.

7. The wand of claim 6, wherein the guide members are integral with the secondary tube.

8. The wand of claim 7, wherein the adjustment collar further comprises a crimp bushing positioned about a portion of the secondary tube for restricting the movement of the tube relative to the adjustment collar when the adjustment collar is in a locked position.

9. The wand of claim 8 further comprising a seal disposed between the adjustment collar and the secondary tube to prevent fluid from leaking out of the aperture.

10. The wand of claim 9, wherein the seal is a compression seal configured and positioned to be compressed against the outer surface of the secondary tube the adjustment collar at the distal end of the primary tube.

11. A watering wand, comprising
- a primary tube defining a hollow interior portion for communicating fluid between a proximal end and a distal end of the primary tube;
- a fitting attached at the proximal end of the primary tube for connecting the wand to a water source;
- a secondary tube slidably disposed in relation to the primary tube for telescopic movement of the wand between a retracted position and an extended position, the secondary tube defining a hollow interior portion for communicating fluid between a proximal end and a distal end of the secondary tube, the primary tube being slidably disposed within the secondary tube;
- a connector, for receiving a fluid dispensing nozzle, attached at the distal end of the secondary tube;
- an adjustment collar for fixings the position of the secondary tube relative to the primary tube, the adjustment collar attached to the distal end of the primary tube, the collar defining an aperture in which the secondary tube is received, wherein the adjustment collar further comprises a crimp bushing positioned about a portion of the secondary tube for restricting movement of the tube relative to the adjustment collar when the adjustment collar is in a locked position;
- a plurality of spaced-apart guide members positioned between the secondary tube and the primary tube to substantially maintain the secondary tube in coaxial relationship with the primary tube, the plurality of spaced-apart guide members being positioned between an outer surface of the primary tube and slidably abut an inner surface of the secondary tube, wherein the guide members are formed on the outer surface of the primary tube and are integral with the primary tube;
- a handle formed at the proximal end of the primary tube to facilitate the gripping of the wand; and
- a seal disposed between the adjustment collar and the secondary tube to prevent fluid from leaking out of the aperture.

12. The wand of claim 11, wherein the seal is a compression seal configured and positioned to be compressed against the outer surface of the secondary tube the by adjustment collar at the distal end of the primary tube.

13. A watering wand, comprising:
- a primary tube defining a hollow interior portion for communicating fluid between a proximal end and a distal end of the primary tube;
- a fittings attached at the proximal end of the primary tube for connecting the wand to a water source;
- a secondary tube slidably disposed in relation to the primary tube for telescopic movement of the wand between a retracted position and an extended position, the secondary tube defining a hollow interior portion for communication fluid between a proximal end and a distal end of the secondary tube;
- a quick-connect coupling attached at the distal end of the secondary tube, the quick-connect coupling comprising a female member and a male member, the quick-connect coupling further configured to receive a fluid dispensing nozzle;
- an adjustment collar attached to the distal end of the primary tube for fixing the position of the secondary tube relative to the primary tube; and
- a notch and a corresponding protrusion formed on the quick-connect coupling such that the protrusion is received within the notch the male and female members are connected, thereby preventing the male and female members from rotating with respect to each other.

* * * * *

UNITED STATES PATENT AND TRADEMARK OFFICE
CERTIFICATE OF CORRECTION

PATENT NO. : 6,619,570 B1
DATED : September 16, 2003
INVENTOR(S) : Erickson et al.

It is certified that error appears in the above-identified patent and that said Letters Patent is hereby corrected as shown below:

Column 9,
Line 26, please delete "wand wherein" and replace with -- wand, wherein --.

Column 10,
Line 3, please delete "fixings" and replace with -- fixing --.
Line 36, please delete "fittings" and replace with -- fitting --.

Signed and Sealed this

Twenty-seventh Day of July, 2004

JON W. DUDAS
*Acting Director of the United States Patent and Trademark Office*